United States Patent [19]
Hurwitz

[11] Patent Number: 5,568,205
[45] Date of Patent: Oct. 22, 1996

[54] CAMERA MOUNTED WIRELESS AUDIO/VIDEO TRANSMITTER SYSTEM

[75] Inventor: James Hurwitz, San Francisco, Calif.

[73] Assignee: Telex Communications, Inc., Minneapolis, Minn.

[21] Appl. No.: 97,792

[22] Filed: Jul. 26, 1993

[51] Int. Cl.[6] .......................... H04N 5/38; H04N 5/225; H04N 5/262; H04N 5/28
[52] U.S. Cl. .......................... 348/723; 348/722; 358/906
[58] Field of Search ...................... 348/705, 722, 348/723, 725, 211, 373, 375, 376, 239; 358/906, 909.1, 310, 335; 360/14.3, 13, 15; H04N 5/222, 5/225, 5/232, 5/262, 5/28, 5/38, 5/44

[56] References Cited

U.S. PATENT DOCUMENTS

| | | | |
|---|---|---|---|
| 4,450,487 | 5/1984 | Koide | 348/211 |
| 4,504,861 | 3/1985 | Dougherty | 348/723 |
| 4,837,638 | 6/1989 | Fullwood | 360/14.3 |
| 5,189,520 | 2/1993 | Okayasu et al. | 358/906 |
| 5,264,935 | 11/1993 | Nakajima | 348/705 |
| 5,325,202 | 6/1994 | Washino | 348/722 |
| 5,341,171 | 8/1994 | Mori et al. | 348/373 |
| 5,420,725 | 5/1995 | Hsu et al. | 360/15 |

Primary Examiner—Victor R. Kostak
Assistant Examiner—John W. Miller

[57] ABSTRACT

A video camera/camcorder mounted transmitter for transmitting audio, video, time code and tally status signals through an omnidirectional antenna to a receiver. The receiver demodulates the signal into its original components, and uses the tally status signal to start and stop a recorder associated with a monitor receiving the transmitted image. The monitor/recorder can, at the option of the user, display and record the time code in a superimposed window on the video screen, thereby producing an accurate window dub of the video being recorded at the camera.

47 Claims, 10 Drawing Sheets

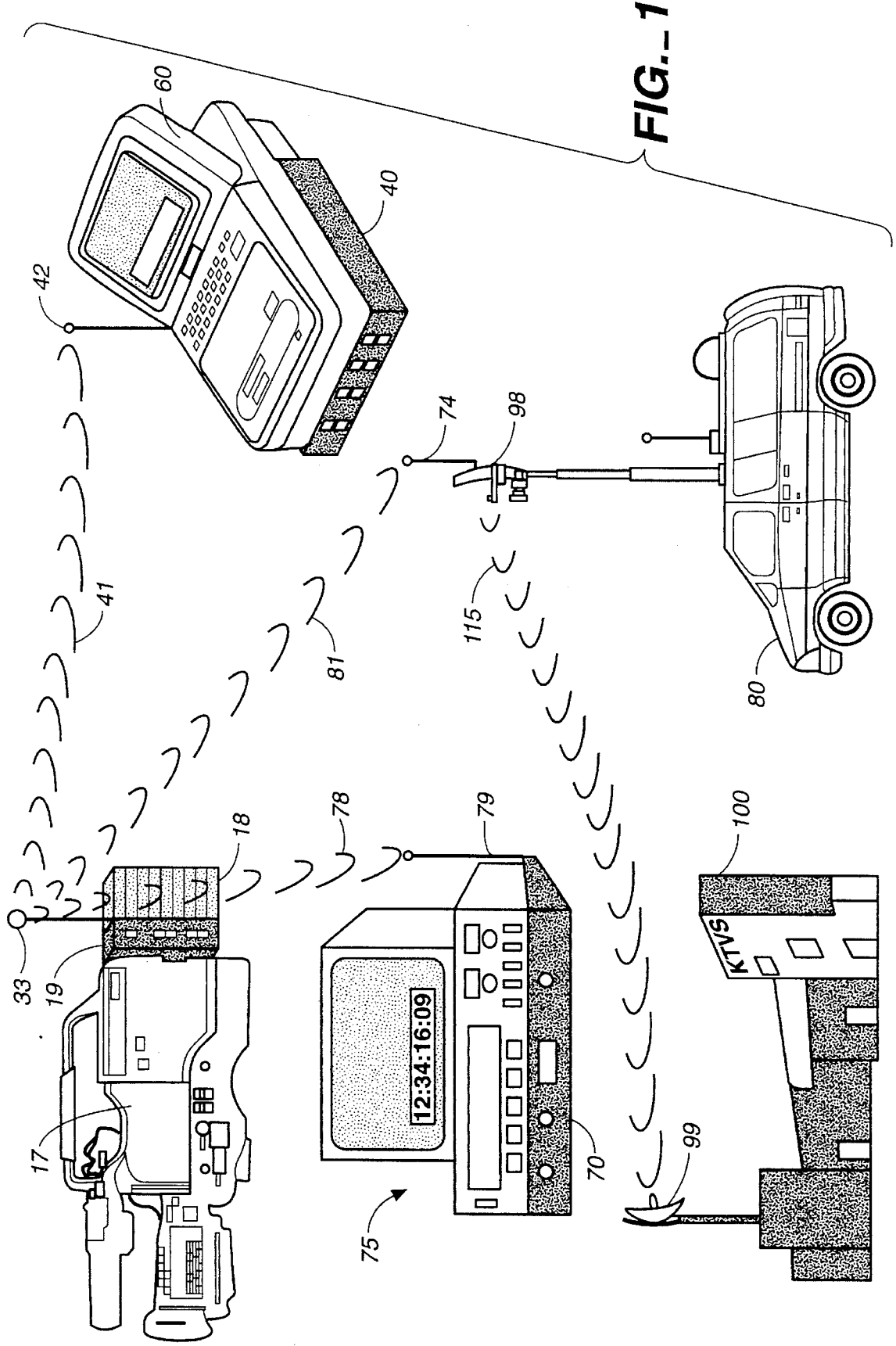

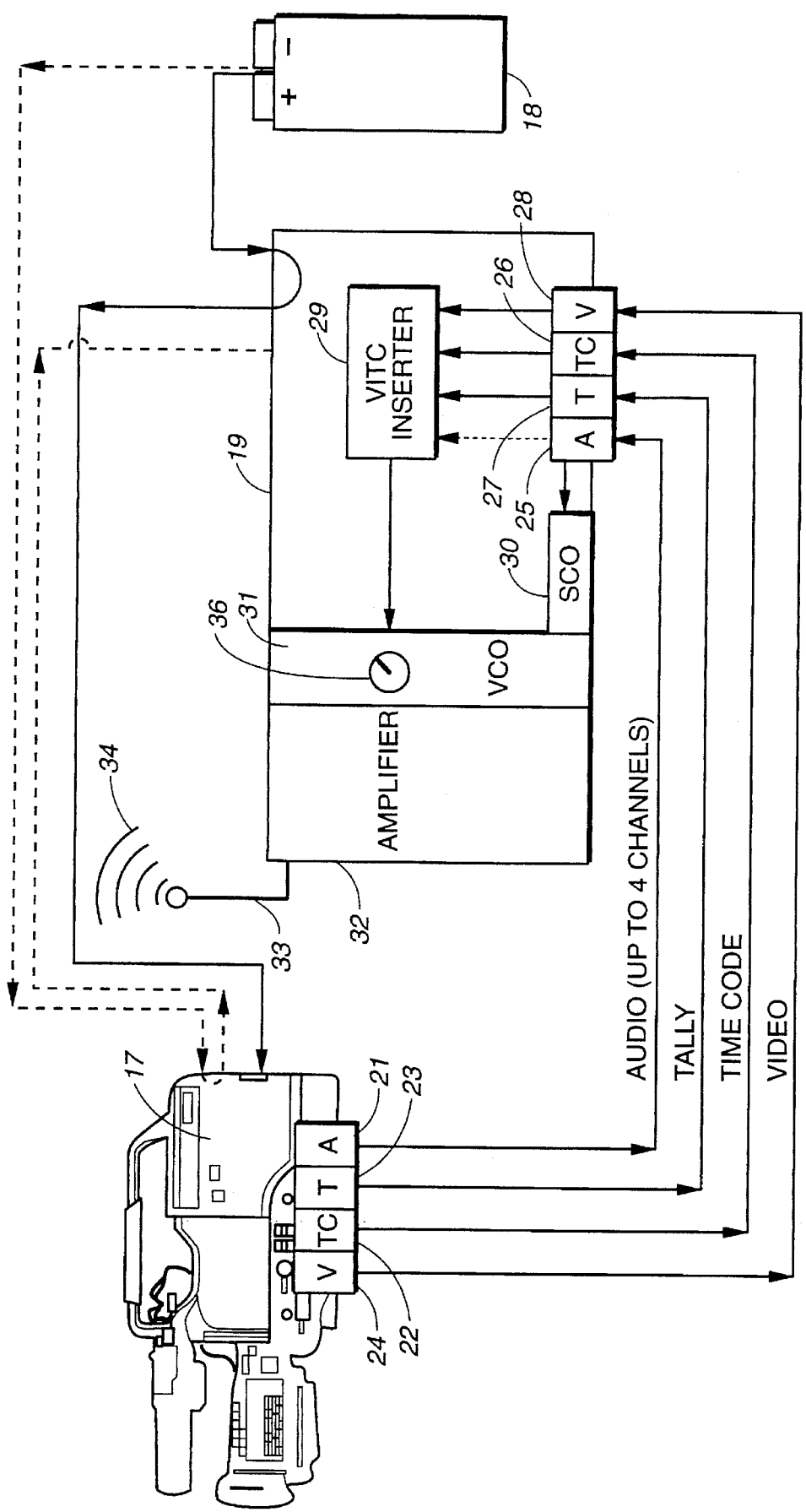
FIG._2

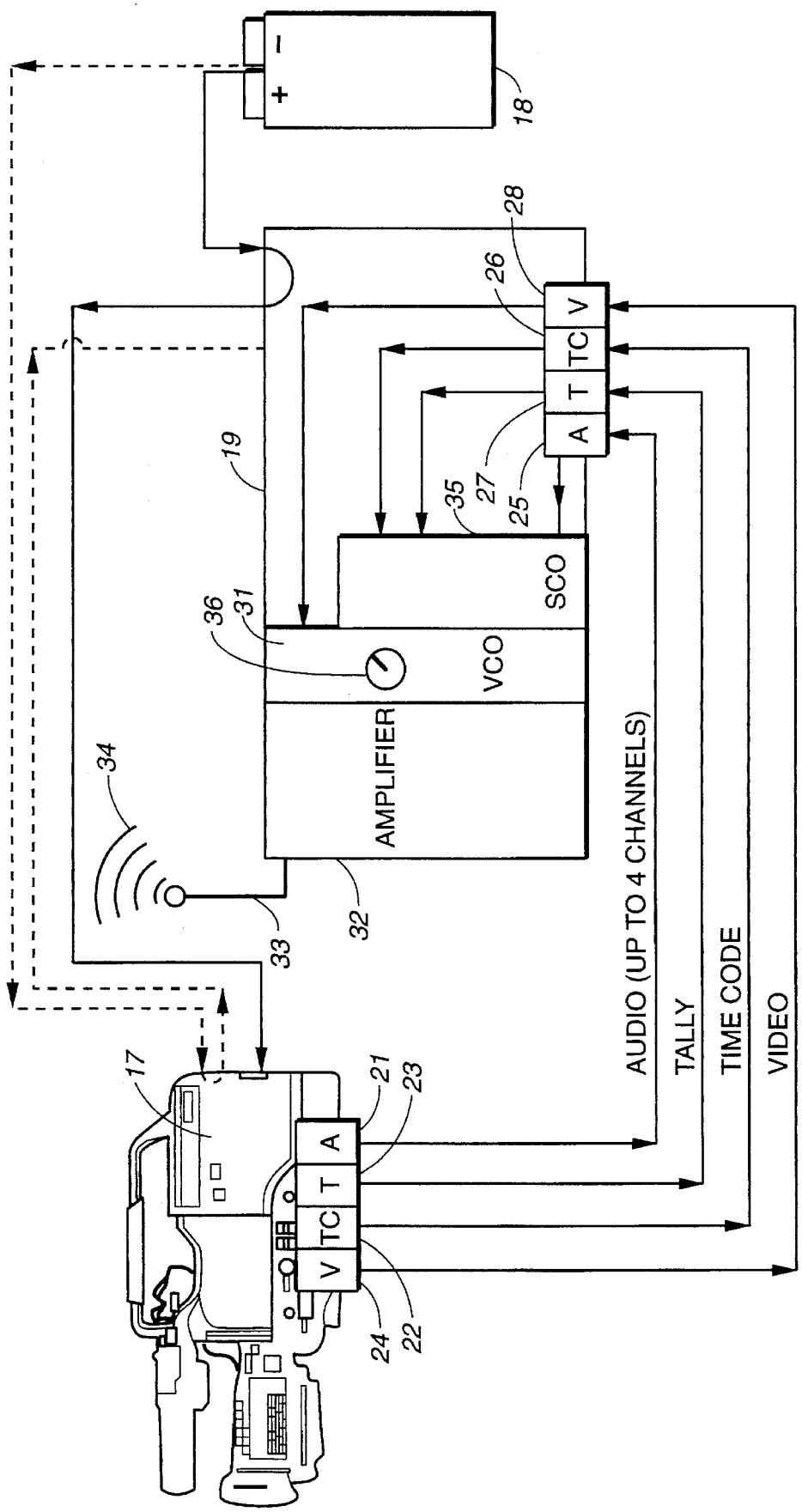
FIG._2A

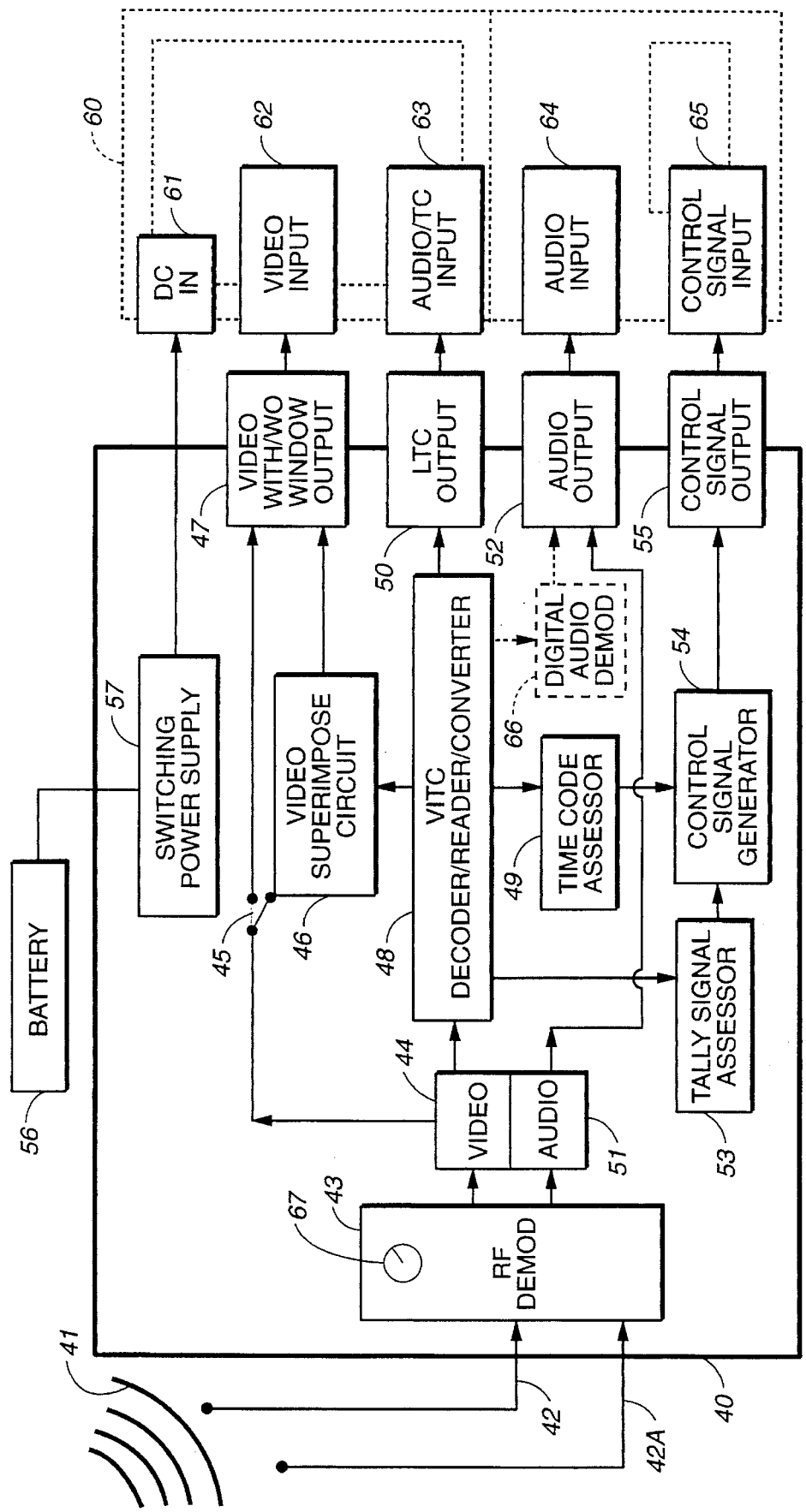

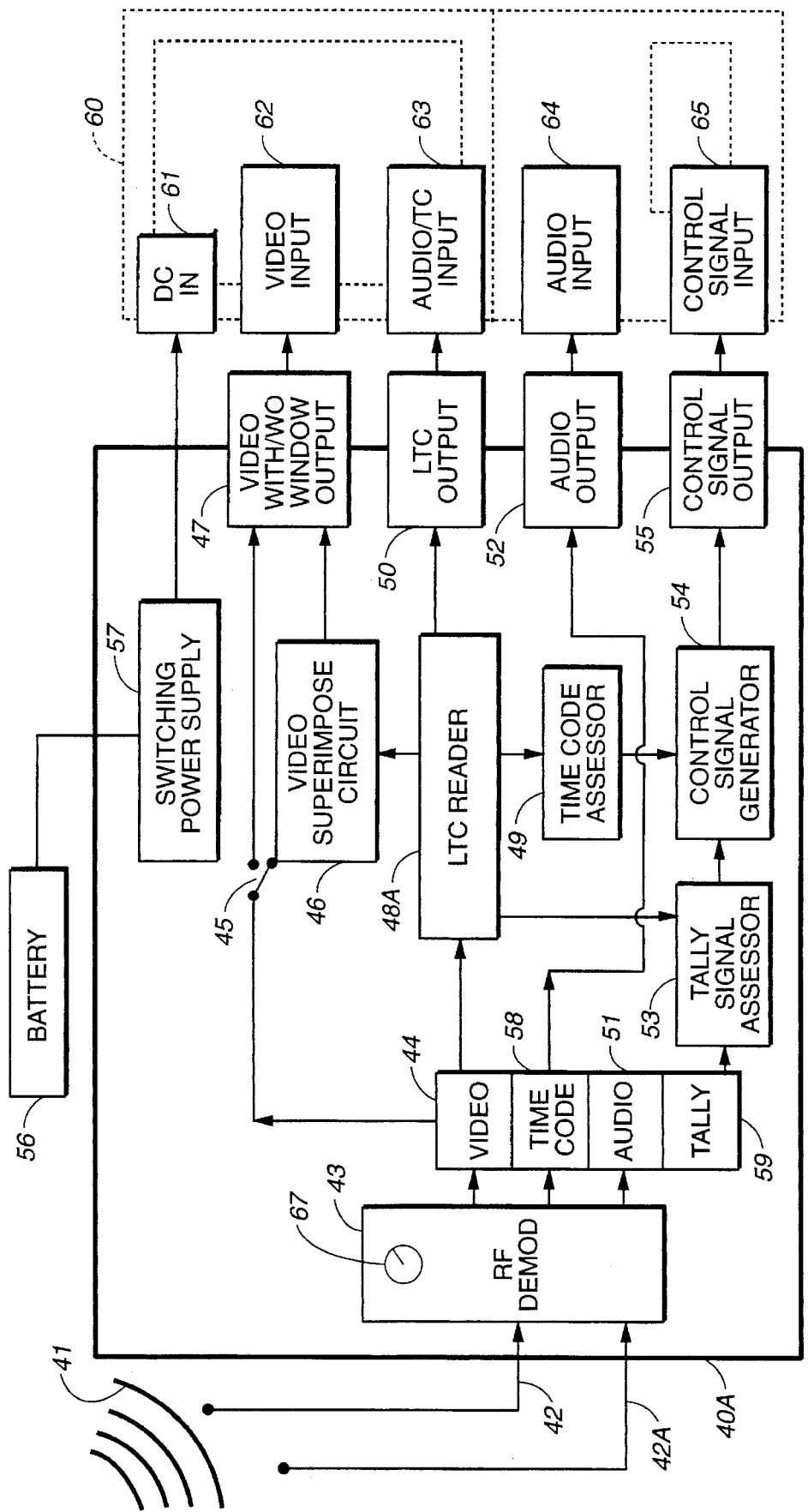
FIG._3A

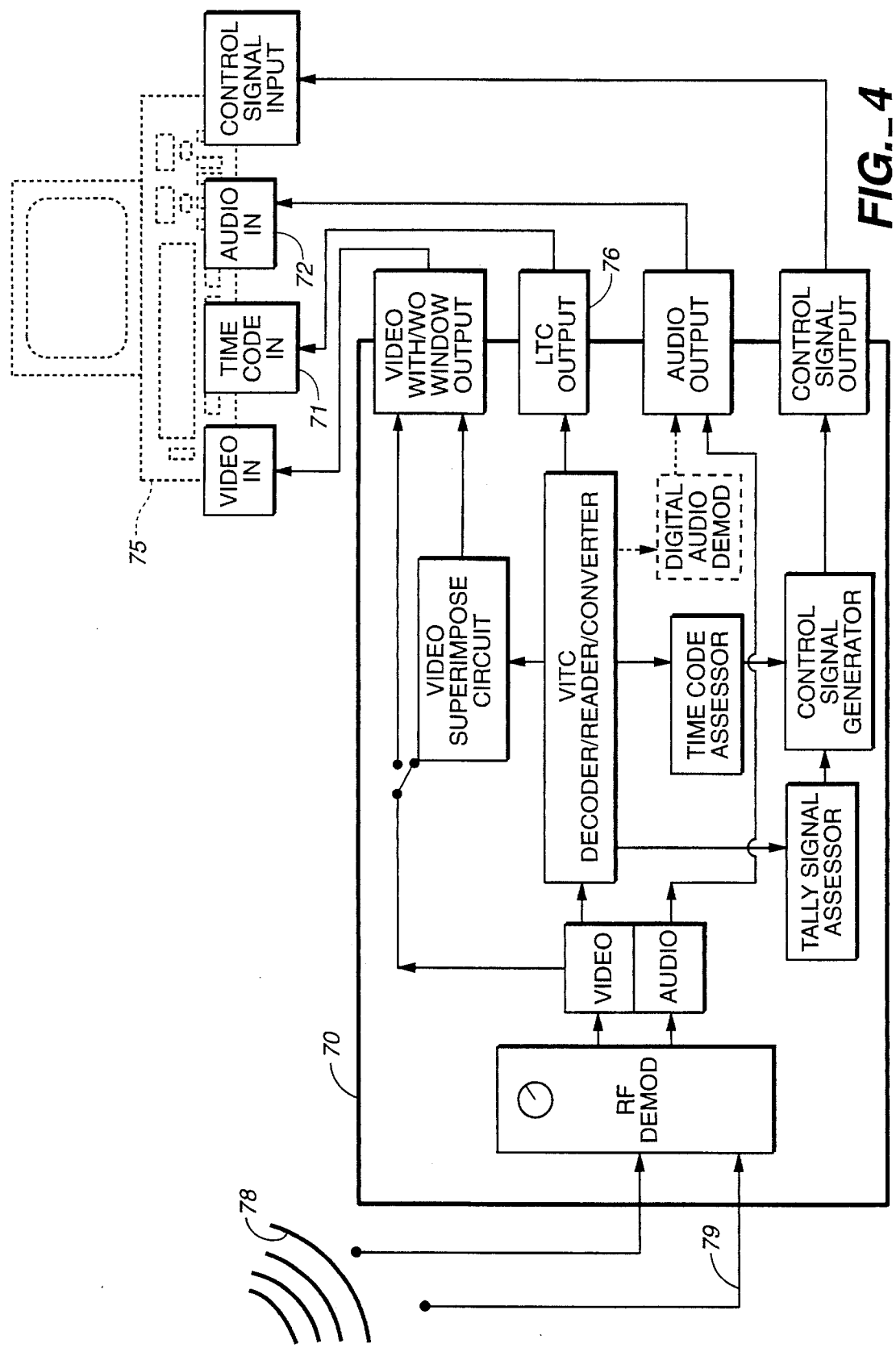
FIG._4

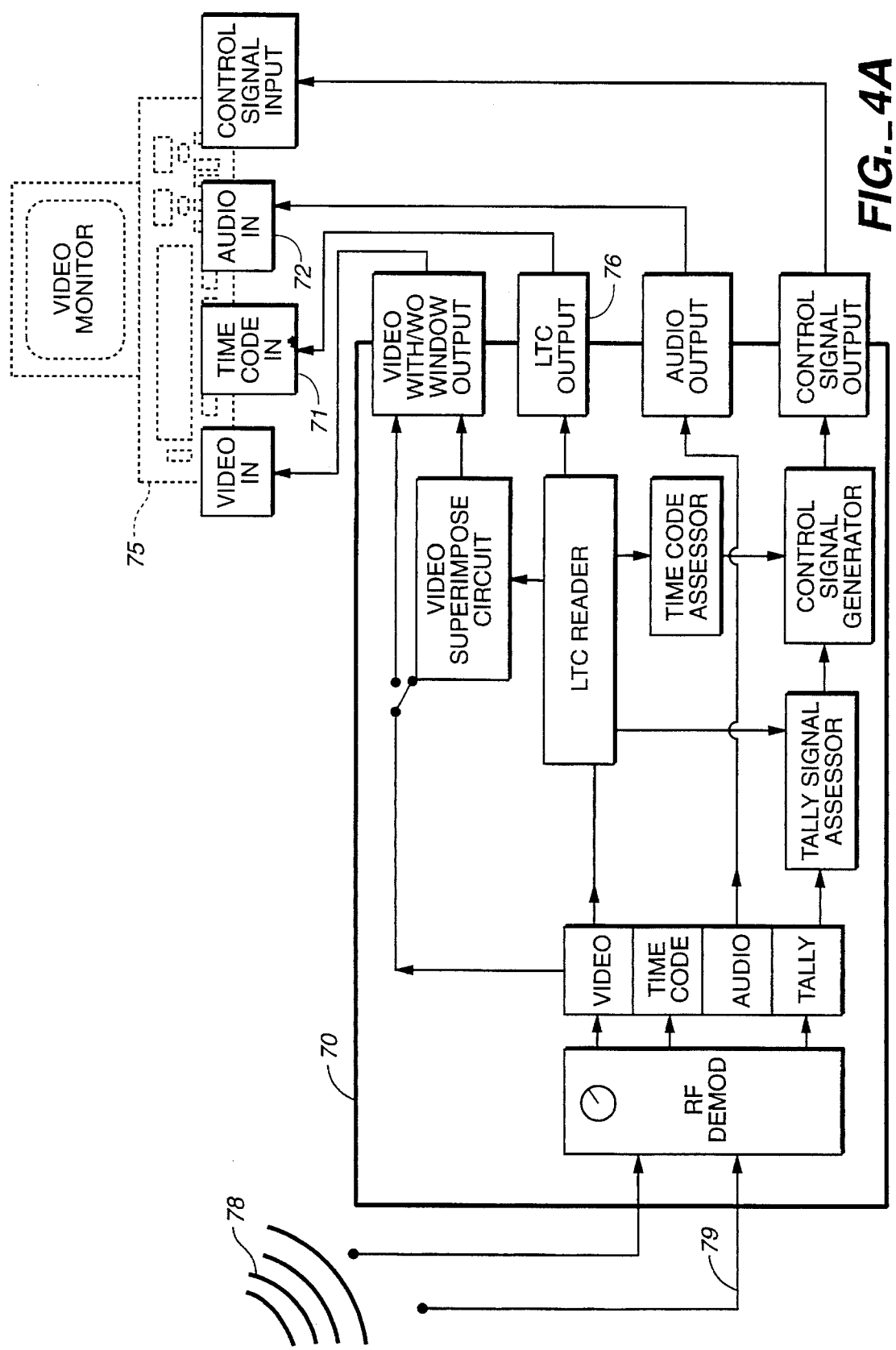
FIG._4A

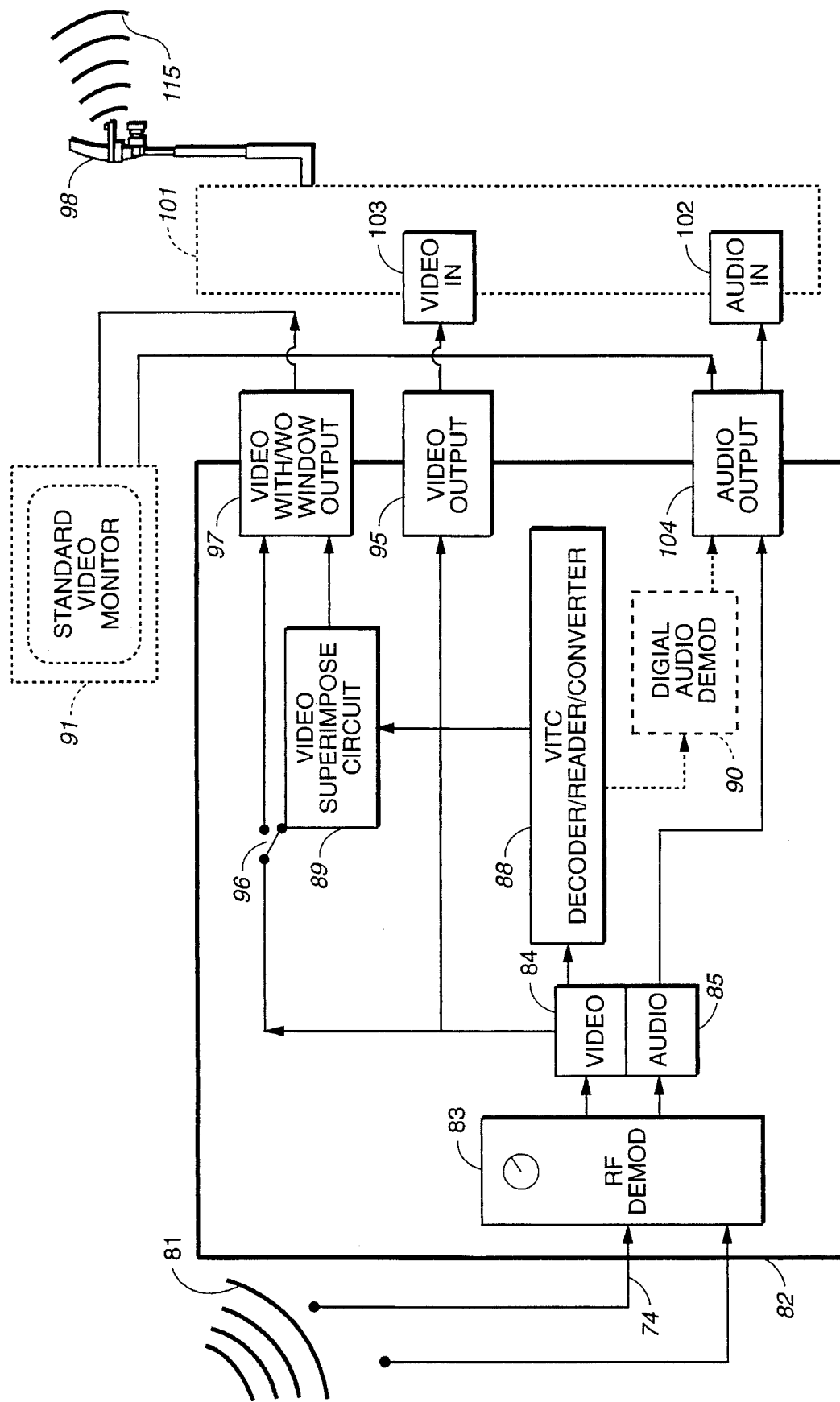
FIG._5

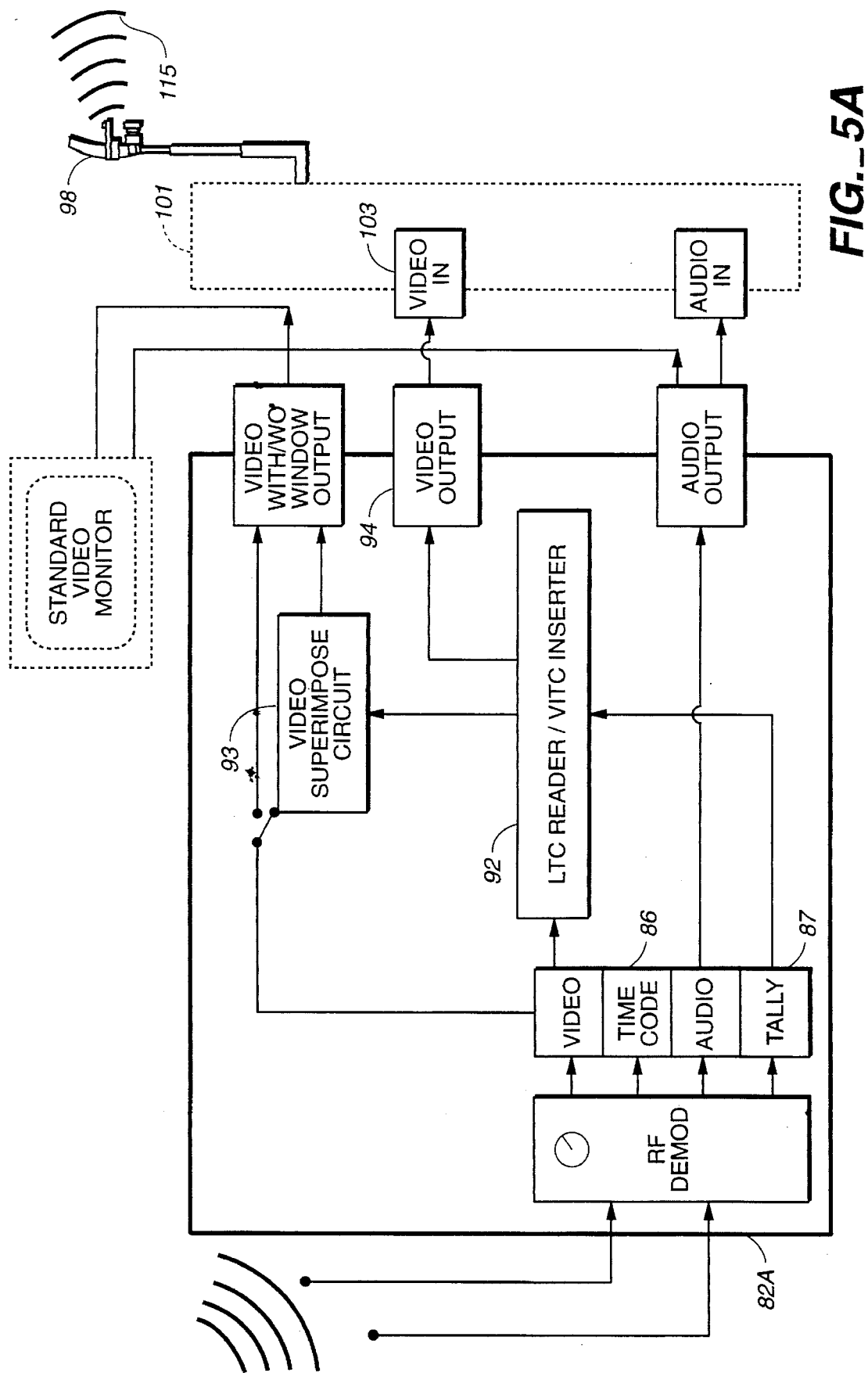
FIG._5A

CAMERA MOUNTED WIRELESS AUDIO/VIDEO TRANSMITTER SYSTEM

FIELD OF THE INVENTION

This invention relates to the field of short-range wireless microwave transmission and reception of audio, video, time code and/or tally status signals, recording them on video tape, and the connection and coordination of devices making such recordings.

BACKGROUND OF THE INVENTION

The process of producing television programming in the field has traditionally been handicapped by the wiring necessary to connect field production cameras and camcorders to various devices such as monitors, microwave and satellite transmitters, and external recorders. Miniaturized components now allow for construction of tiny microwave transmitters and receivers. Up to now, they were built primarily for military use including battlefield applications as well as mounting in missiles for strike confirmation and telemetry. These devices can he useful when applied to the television production industry. Three major areas where this is most obvious in the fields of Electronic Field Production (EFP), Electronic News Gathering (ENG), and the broadcast of live events.

ELECTRONIC FIELD PRODUCTION (EFP)

The process of recording images in the field to he edited at some later time is often handicapped by the producer/director's inability to see what the cameraman is shooting as the cameraman shoots the image. The devices and methods now available in the field to review the footage shot by the cameraman include rewinding the video tape in the camcorder to view it in the camcorder viewfinder, wiring to a separate video monitor, or transferring the video tape from the camcorder to a video tape recorder (VTR) for review. Each of these methods is cumbersome and time-consuming, and is usually bypassed in the interest of convenience. As a result, the cameraman must usually shoot a large variety of scenes to be sure to get the right one for post-production processing. If the cameraman has not shot the scene precisely as the producer/director had envisioned, the quality of the final program will likely suffer.

In normal post-production processing, the original video tape is sent out to be copied before the post-production processing begins to avoid working with an original video tape and accidentally damaging or erasing any images that it contains. This step causes an additional delay in post-production processing, increases costs, and reduces flexibility that would be eliminated if such processing were not needed or was performed simultaneously with the field production.

A good example of the type of problem that exists in the video production industry is illustrated in the shooting of a documentary at a remote location. Often a production crew is made up of producer/director, cameraman, and sometimes an assistant who are only able to visit the remote location for a limited time due to budgetary and scheduling constraints. Their goal is to obtain the shots necessary to support the producer's ideas and concepts for the final edited program. Once arriving at the field location, the producer/director often finds that the actual site conditions vary from the expectations and therefore shots must be improvised on-site, or the planned shots must be modified to include or delete certain elements to obtain the desired effect for the visual story the producer/director wants to tell. Often, many hundreds of minutes of video tape are shot and then brought back to the studio for editing where only a small fraction (less than 10 percent) is used in the final product. Since the producer/director often does not take the time in the field to review the cameraman's shots, and the communication between the cameraman and the producer/director is not always one hundred percent clear, the shot desired by the producer/director is not always recorded. For instance, in a documentary about a corporation, a visit is made to the headquarters of that corporation in a city. After completing the visit to the corporation, the producer/director instructs the cameraman to take a "wide shot" of the corporate headquarters. The producer/director had in mind a wide shot which avoided the surrounding buildings as much as possible. Unfortunately, the cameraman understood the instructions to mean a shot of the building in context with its neighboring buildings. The producer/director then returns to the production studio and the video tape is reviewed. Only at this viewing does the producer/director find out that the shot that he/she wanted was not shot in the desired style. Because the field location is often remote from the home production studio, there is no opportunity to re-take the shot. To return to that site, whether it is half-way across the globe or just across town, is usually cost-prohibitive and impossible given the tight deadlines of TV production. Occasionally, the raw footage lends itself to be corrected in post-production, a time-consuming procedure involving expensive special effects. More often than not, however, it cannot be corrected in post-production, and the producer/director's concept for the visual storytelling process has been compromised.

ELECTRONIC NEWS GATHERING (ENG)

In live electronic news gathering (ENG) news broadcasts or on-site taped (not live) reports, the news truck or van carries several hundred feet of umbilical camera cable so that the audio and video signals from the video camera producing the image of the event is routed over the cable directly to the news van/truck for re-transmission by satellite dish or directional antenna to a central news gathering facility. The location of the camera for live reports is limited by how close the truck can be driven to the scene and the length-of the umbilical cable from the camera to the truck. Any reporting which takes place beyond the range of the umbilical cable must be placed on tape and that tape replayed in the news van for it to be transmitted to the central news gathering facility, causing delays, rushed assembly of stories, and sometimes even missed stories.

LIVE EVENTS

The current practice for wireless transmission of audio visual signals from a short range is to use a cameraman carrying a video camera which is linked by wires to a transmitter pack and directional antenna carried by a second person following the cameraman. These camera teams are often used at stadiums and arenas to provide video images of the crowd around the stadium or arena. A receiving antenna is often mounted at a single high location in the stadium or arena and it is the job of the cameraman's assistant to point the directional transmitting antenna toward the stadium-mounted receiving antenna. A separate person is often required at the receiving station to point a directional receiving antenna toward the transmitter to best pick up the directional signal of the transmitter antenna. The end result is that the live audio visual signal can be recorded or re-transmitted as appropriate from the receiving station attached to the antenna.

As described above, a variety of steps and device limitations are present in the existing camera, camcorder, monitoring and re-transmission devices which require additional steps be taken to overcome these drawback shortcomings and limitations in producing television programming.

These drawbacks are overcome by the invention of the present application.

SUMMARY OF THE INVENTION

The invention provides a microwave link consisting of a transmitter and receiver for transmitting omnidirectionally and receiving standard signals generated by video cameras and/or camcorders to be used in a variety of applications.

TELEVISION PRODUCTION

When used in television production, the microwave link transmits and receives signals from the camcorder, including audio, video, the camcorder-generated time code and/or a tally status signal. (The tally status signal identifies when the audio and video signals are being recorded by the video tape recorder in the camcorder).

The device is designed for various power output configurations, including operation under Federal Communications Commission (FCC) regulations. One such configuration uses the frequency spectrum and power limitations specified under FCC Part 15, which allows for use of the system by anyone without a special license.

A second such configuration falls under specifications outlined in FCC Parts 74 and/or 94, which allow for greater power output and therefore increased broadcasting range. Under current regulations, users must be licensed to operate the device in this configuration.

The invention includes an audio-video signal transmitter which has been miniaturized so that it can be camera-mounted and can be powered from its own batteries or from power it receives from the same battery which is supplying power to the camera. The transmitter receives the standard high-quality video signal and up to four audio signals via wires from standard camcorder output connectors. Separate wires are routed from other output connectors on the camcorder to receive and re-transmit the time code and/or tally status signals.

The transmitter can be mounted to the camera in conjunction with the various battery systems in common industry use. One mounting system sandwiches the transmitter between the camera and the battery, drawing power for itself from the battery's hot shoe, while simultaneously passing voltage through to the camera. On other systems, it is mounted behind or beside the battery, drawing power from one of several sources available from the camera's DC power system.

An omnidirectional antenna is directly attached and supported by the transmitter module. At low power levels, the transmitter is capable of transmitting the modulated (sub-carrier or VITC) audio, video, time code, and tally status signals effectively for 100 yards in line of sight, and at higher power ratings (consistent with FCC licensing limitations) the range increases to more than 1000 yards in line of sight.

The omnidirectional nature of the antenna eliminates the need for a camera assistant to point a directional antenna toward a receiving antenna. The radio frequency (RF) signal transmitted by the transmitting module can be switched by the cameraman between two or more transmitting frequencies in the microwave band.

The transmitted RF signal is received by one or more receiving antennas mounted to a receiver module. The receiver module takes the RF signal and demodulates it to reproduce the signals from the camcorder. The signals are further processed through the receiver module to provide input signals to a portable television monitoring and/or recording device (such as a Sony* Video Walkman*). The audio and video signals are reproduced so that the producer/director of the production can hear and view the image being recorded by the camcorder as seen by the cameraman. This allows the producer/director to immediately inform the cameraman of adjustments which he/she desires to satisfy the production objective as defined by a script or other guidelines.

A feature of the receiving module and monitoring receiving system is that, at the option of the user, the time code can be displayed in a superimposed window generated by the receiver module on the video screen and recorded on the video tape in the monitoring/recording device.

An additional feature is that the starting and stopping of the second, separate tape recorder is, at the option of the user, controlled by a control signal generated by a control signal generator within the receiving module. The control signal generator receives an indication of tally (recording/not recording) from the camcorder and generates the control signal appropriate to start or stop the tape recording device associated with the monitor that is used by the director/producer of the video piece. This second video tape recorder provides a duplicate tape of the audio video tape in the camcorder, as the starting and stopping of the recording function in the camcorder is duplicated at the remote monitoring/recording device. The recording of the time code and its display in a superimposed window on the video provides a means for the producer/director or editor to immediately identify those segments of the tape by time code that are chosen for initial or final post-production editing. This eliminates the time delay (to duplicate the original video tape) before beginning to review the videotaped sequences and images and then to edit them. The simultaneously-recorded second copy of the tape usually will not be of sufficiently high quality for retransmission, but it will be of sufficiently high quality for review of the audio visual images so that editing of those images can be done and then the high quality counterparts of those segments can be quickly extracted from the original high quality video tape when it returns from the field.

The distant monitoring recording device can be mounted in a remote production rack. Instead of receiving the signal, demodulating it, and recording it on a low-cost Video Walkman*-type unit. the signals can be recorded on a studio-quality VTR. Like the Walkman*-type unit, the studio-type VTR also receives a control signal that would control (record stop/start) the studio VTR and would duplicate exactly the field tape in the camcorder, with the option of a superimposed time code window. However, using a studio-type VTR, the tape generated at the remote location would be of high video quality and would include a separate dedicated time code track, like the one on the camcorder original. This arrangement of components would allow for the remotely-recorded tapes to be taken directly into off-line editing or used for "daily" review.

The receiver can also be mounted in a truck or van and rebroadcast for live on-air applications. Greater range can be gained by mounting one or more antennas on top of the vehicle and/or atop a telescopic mast. Higher power can be used at the transmitter by users licensed under FCC Part 74. The signal received by the truck could immediately be re-broadcast to provide a live shot to a TV station via a standard ENG or satellite link. The time code and/or tally status signal could also be simultaneously transmitted so that a studio-based VTR could record the live shot, and video editing, which is more conveniently done in the studio, could be started. Under these circumstances the audio, video and time code signals could be received, recorded, and used in post-production just as the like signals on the field original tape would be used. The signals transmitted from the van could also be monitored and recorded in the van.

Receivers could also be placed at strategic locations around a confined-action area such as a sports stadium or race track. These receivers would receive the signals from one or more cameras with the transmitters according to the invention in various positions on the field, in the stands, and/or mounted in sports equipment and/or vehicles used during the event. The signal from the receiver can be fed to a production video switcher or VTR, where the received signals can be integrated into a live or slightly delayed broadcast. This would eliminate the need for running umbilical wires from the camera position or the need for camera assistants to support and direct directional antennas as presently attached to the camera and/or receiver.

BRIEF DESCRIPTION OF THE DRAWINGS

FIG. 1 shows an overview schematic diagram illustrating examples of the invention and transmission of signals for video production;

FIG. 2 is a schematic diagram at the video camera.

FIG. 2A is an alternate configuration of FIG. 2.

FIG. 3 is a schematic diagram at a portable monitoring location.

FIG. 3A is an alternate configuration of FIG. 3.

FIG. 4 is a schematic diagram at a fixed site.

FIG. 4A is an alternate configuration of FIG. 4.

FIG. 5 is a schematic diagram for providing signals to an ENG mobile unit.

FIG. 5A is an alternate configuration of FIG. 5.

DETAILED DESCRIPTION

Figure 6:
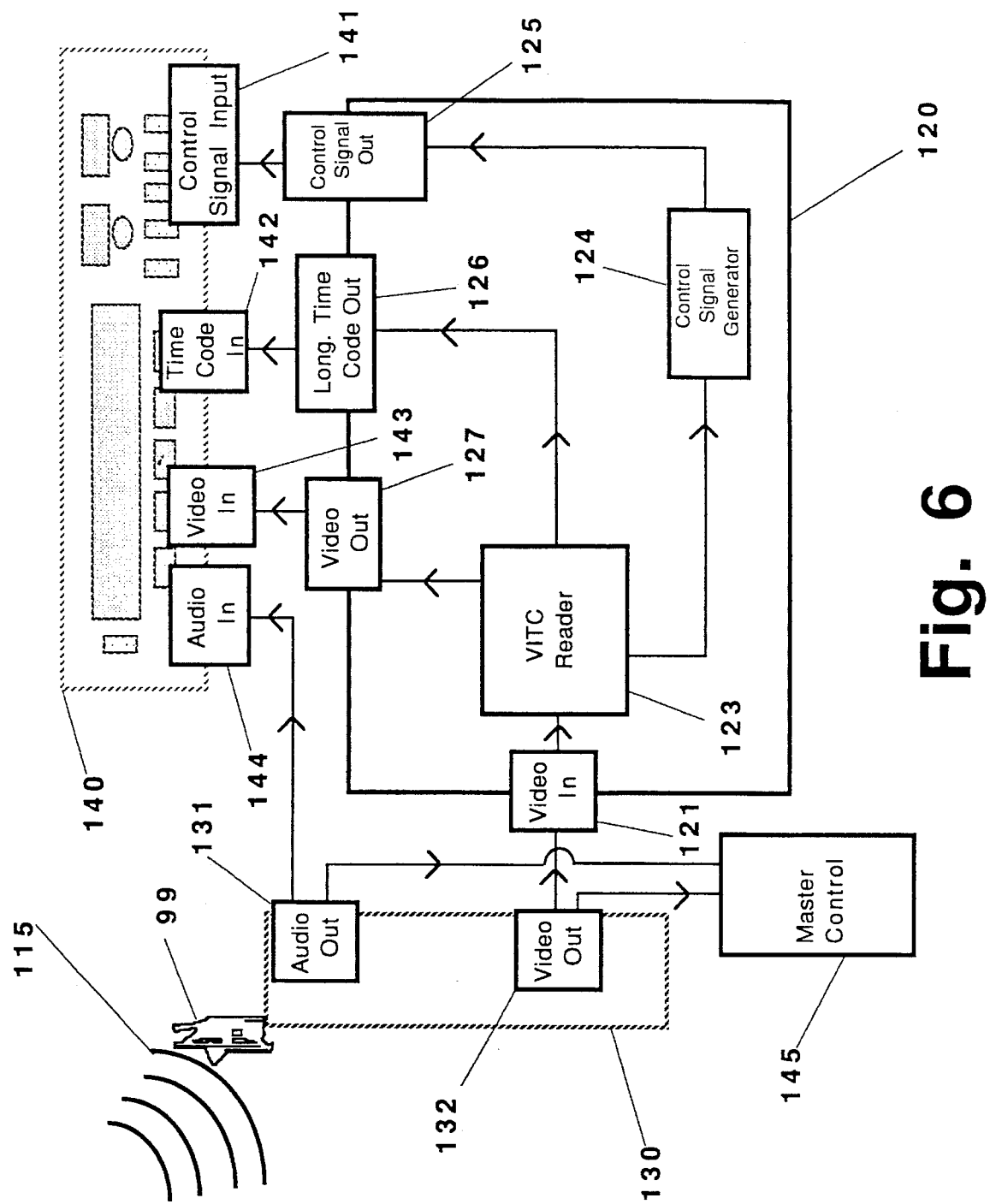
FIG. 6 is a schematic diagram for use in a studio broadcast center environment.

The overall system using embodiments of the invention can be seen in FIG. 1. A video camera/camcorder 17 provides electronic signals to a miniaturized transmitter module 19 having a short omnidirectional antenna 33. The camera/camcorder 17 can provide any or all of the following output signals (FIG. 2) at output ports: one-to-four audio signals 21, Longitudinal Time Code (LTC) 22, tally status signal 23, and video 24. These signals are routed by wires to input ports 25, 26, 27, and 28 respectively on the transmitter module 19. The LTC and tally status signal, if present, are digitally encoded onto the video signal's vertical interval by a Vertical Interval Time Code (VITC) inserter circuit 29. Optionally, one or more audio signals can be encoded in the vertical interval (see dotted line connecting input port 25 and VITC inserter 29). The resultant video signal with the newly-encoded information in the vertical interval is sent to the frequency-agile modulator 31 of the transmitter module 19. Simultaneously, one-to-four audio signal(s) are sent to a subcarrier module 30 containing one or more subcarrier oscillator(s). The resultant subcarrier signal is(are) sent to the frequency-agile modulator 31. The modulator 31 modulates these signals on a frequency selected by a selector switch 36. The resultant radio frequency (RF) signal is amplified through the amplifier 32. The amplified RF signal 34 is transmitted through an omnidirectional antenna 33.

Alternately, the time code and tally status signals are also sent to the subcarrier module 35 and transmitted as seen in FIG. 2A.

The miniaturized transmitter module 19 on the professional-quality video camera/camcorder 17 receives its power by either a separate dedicated battery or by tapping into the power system for the camera/camcorder 17. In some instances, the transmitter 19 is mounted with the customized mounting plate (such as an Anton-Bauer˙plate) that is provided to make the battery 18 (FIG. 1) integral with the camcorder 17 when it is attached. In other instances there is a pocket or other contact connection which is designed to connect the battery 18 to the camera 17 and provide power. In each instance, the transmitter module 19 is configured to mate with the battery mounting hardware and be supported from the camera/camcorder unit 17. Special connectors may be provided so that the transmitter module 19 can tap into the wiring between the battery and the camcorder to obtain power required for transmitting.

When transmitting at low power ranges (at power settings below the specifications of Part 15 of the FCC code, above which an FCC license is required for the operator), the transmitter is capable of providing a good quality signal at line of sight ranges of approximately 100 yards. The expected power consumption for this embodiment is 200 milliamps at 12 volts DC to provide an effective radiated power of 50 millivolts per meter at three meters. The expected power consumption for a more powerful transmitter, up to 250 milliwatts output power in another embodiment is 225 milliamps at 12 volts DC input.

The transmitted signal is received by one or more receiving antennas 42, 42A (the additional antennas provide input for a space diversity antenna system) attached to a receiver unit 40 (FIG. 3). The receiver 40 receives the RF input signal 41 and routes it to a frequency-agile demodulator 43 which breaks the signal up into its original components. The frequency demodulated is selected by a manual selection switch 67. A video signal processing circuit 44, and an audio (up to four channels) processing section 51 receive and process their respective signals. The video output signal from the video processing circuit 44 is routed directly to a video output port 47 or to a video superimpose circuit 46 at the discretion of the user, as set by a switch 45. If the user selects the video superimpose circuit 46, the superimpose circuit 46 receives a time code signal read by the time code decoder/reader/converter circuit 48 and superimposes the actual numerals of the time code in the superimpose window on the video signal and delivers this signal to the video output port 47 of the receiver unit 40. The time code is also converted from VITC to LTC and sent to a time code output port 50 on the receiver 40.

If received in a subcarrier (as seen with the solid line connecting 25 to 30 in FIG. 2), the audio signals are processed through the audio demodulation circuit 51. If the audio signals are received in the vertical interval (as seen with the dotted line connecting 25 to 29 in FIG. 2), they are decoded in a digital audio processor 66. Whichever way they are decoded, the audio signals are directly routed to the audio output port 52 of the receiver 40.

If the time code and tally status signals have been incorporated into the VITC of the video (as in FIG. 2), those signals are decoded by the VITC Decoder/Reader/Converter circuit 48. The time code is sent to a time code assessor circuit 49 and a video superimpose circuit 46. The tally status signal is sent to and tally signal assessor circuit 53.

Alternately, if the time code and tally status signals are transmitted on one or more separate subcarriers (as in FIG. 2A), they are demodulated and processed by signal processors 58 and 59 respectively (FIG. 3A). The LTC is sent to a time code reader 48A. The time code is then sent to a time code assessor circuit 49 and a video superimpose circuit 46. The tally status signal is sent to a tally signal assessor circuit 53.

The tally signal assessor circuit 53 evaluates whether the camcorder's 17 tally signal is on. If it is on, it will provide an "on" indication to a control signal generator 54, discussed below.

If time code is present, the time code reader circuits 48, 48A provide their output signal to the time code assessor circuit 49. The time code assessor circuit 49 evaluates whether the time code is changing. If it is changing, it will provide an "on" indication to the control signal generator 54.

The control signal generator 54 (e.g. serial signal) stores the control signal configurations for a variety of manufactured video tape recorders (VTRs) in a non-volatile memory circuit. The interconnecting cable between the control signal output port 55 of the receiver 40 and the control signal input port 65 of the recorder/monitor 60 is configured to indicate to the control signal generator 54 which monitor/recorder 60,75 is connected. The appropriate set of control data is then called from said memory. When the control signal generator 54 receives an "on" indication from either the tally signal assessor circuit 53 or the time code assessor circuit 49, a control signal is generated to place the external VTR 60,75 into "record run" mode. When that signal changes to indicate the camcorder's 17 VTR has stopped, the signal generated at the control signal generator 54 changes to "record pause" (or "record stop" depending on the external VTR), pausing the external VTR 60,75 (FIGS. 3, 3A, 4, 4A).

The control signal generator 54 also generates the "record pause" signal on loss of the signal from the transmitter 19 due to the camcorder 17 either being powered down or moving out of range, stopping the external recorder 60,75.

A control signal output port 55 is provided on the receiver 40 to allow connection to the control signal input port 65 of an external recorder/monitor combination 60 such as the Sony* Video Walkman*.

A battery 56 provides power to the receiver 40. A switching power supply 57 in the receiver provides DC power to the recorder/monitoring unit 60 via a battery eliminator plate 61.

The video signal is routed from the output port 47 on the receiver 40 to a video input port 62 on the recorder/monitor 60. The time code output is provided to an audio or time code input port 63. Some recorder/monitoring devices have a dedicated time code track supplied by a time code input port 71 as discussed below and seen in FIG. 4, although some devices like the current Sony* Video Walkman* do not.

An audio input port 64 is provided on the Video Walkman* 60 to receive the audio signals from the receiver's audio output port 52.

In high-end Electronic Field Production (EFP) situations (FIGS. 4 and 4A), the camcorder-mounted transmitter unit 19 can transmit its signal 78 (FIG. 1) to a receiver 70,70A (FIGS. 4, 4A) connected to a non-portable studio-style VTR/monitor combination 75. The antenna(s), demodulating circuits and processing units of the receiver 70,70A are as was described for the receivers 40,40A in FIG. 3 and 3A respectively. The difference here is that the receivers 70,70A are rack-mounted and provide their output signals to a high-end studio-quality VTR/monitor combination 75. In addition to the one-to-four audio inputs 72, this VTR/monitor combination 75 has a separate time code input 71 that receives a time code signal from an output port 76 on the receivers 70,70A. The receivers 70,70A are AC powered.

In a common Electronic News Gathering (ENG) situation, the camcorder-mounted transmitter unit 19 can transmit its signal 81 directly to a receiver 82 (FIG. 5) rack-mounted in a mobile ENG remote vehicle 80 (FIG. 1). The vehicle 80 has one or more antennas 74 mounted externally that receive the RF signal 81 from the camcorder-mounted transmitter 20. The RF signal 81 is demodulated in the demodulator 83 (FIG. 5). The video and audio signals are reproduced by the respective video and audio demodulation circuits 84,85 to provide video and audio output signals. The video, which still carries the encoded time code and tally status signal in its vertical interval, is sent to a VITC decoder/reader/converter circuit 88, which provides time code for the video superimpose circuit 89. If the video also carries one or more audio signals in its vertical interval, the audio information is sent to a digital audio decoder 90.

The video is also sent to a manual switch 96 which directs it either to the video superimpose circuit 89 or directly to an output port 97. If the video superimpose circuit is chosen, the output port 97 is sent a video signal with a time code window superimposed on it. If the superimpose circuit 89 is not selected at the switch 96, clean video is sent to the output port 97. Clean video with VITC encoded is always sent to a separate video output port 95. The output port 95 can be connected to a video monitor 91 mounted in the ENG van. Demodulated audio, available at output port 104, can also be sent to the van-mounted video monitor.

The demodulated signals from the audio and video output ports 104 and 95 are connected to the similar input ports 102 and 103 on an ENG microwave or satellite uplink transmitter 101. Alternately, if the time code and tally status signals are transmitted on one or more separate subcarriers (FIG. 2A), they are received by receiver 82A (FIG. 5A), where they are demodulated and processed by signal processors 86 and 87, respectively. The time code is sent to a time code circuit 92 that reads it, sends it to the video superimpose circuit 93 and simultaneously generates a VITC signal. The tally status signal is also encoded into the VITC signal at the time code circuit 92. The encoded video is routed to the video output port 94, which feeds the video input circuit 103 of the ENG microwave transmitter 101.

The directional antenna 98 sends a signal 115 to a studio broadcast control center 100 via direct microwave, one or more land-based microwave hops, or by bouncing the microwave signal through a satellite (FIG. 1).

Once the signal 115 is received by the signal receiving antenna 99 at the studio broadcast center 100 and demodulated by a microwave receiver 130 (FIG. 6), audio and video signals are provided to audio and video output ports 131, 132. The audio signal is directly connected to an audio input port 144 of a studio-type VTR 140. The video signal is sent to a VTR controller 120 having a video input port 121. The video signal is then routed to a VITC reader 123 that converts the VITC to a LTC format (sent to output port 126) and a record stop/start signal (sent to a control signal generator 124). The control signal generator 124 produces a control signal with the appropriate parameters so that the studio type VTR 140 is controlled according to the start/stop/record functions as operated by the cameraman at the camcorder 17 at the remote location. The control signal is provided to a data control signal output port 125 and subsequently to a control signal input port 141 on the VTR 140. Similarly, video input and time code input ports 143 and 142 on the studio type VTR 140 receive the video and time code inputs from the video and time code output ports 127, 126 respectively of the remote VTR controller 120. The video and audio signals are also sent to the television station's master control facility 145, where they are available for immediate broadcast.

As described above, the embodiments of the invention provide the opportunity for remote viewing and logging of a cameraman's work, a second tape to be field recorded by a portable monitoring/recording device (such as a Sony Video Walkman*) or alternately recorded on a studio-type VTR, and provides the opportunity for the live camera images and audio to be transmitted to a mobile receiver and then relayed to a central broadcast studio for editing or live coverage. Tremendous flexibility is provided to a cameraman who is able to move without umbilical cords or wires while having contact with his home base or director/producer, providing a better quality and more quickly produced production product exceeding the previously known prior art.

While the invention has been described with regard to specific embodiments, those skilled in the art will recognize that changes can be made in form and detail without departing from the spirit and scope of the invention.

I claim:

1. A video production device comprising:

a transmitter, said transmitter receiving video, audio, and time code signals from a camcorder, said transmitter modulating and transmitting the video, audio, and time code signals via an omnidirectional antenna.

2. A video production device as in claim 1, wherein said transmitter is camcorder mounted and said omnidirectional antenna is supported from the camcorder-transmitter unit.

3. A video production device as in claim 2, wherein said transmitter also receives a tally status signal from said camcorder and modulates and transmits it along with the video, audio, and time code signals.

4. A video production device as in claim 3, wherein said transmitter receives its power by tapping into the power source for said camcorder.

5. A video production device as in claim 3, wherein said transmitter include a switch to select one of at least two transmission frequencies for transmission.

6. A video production device as in claim 3, wherein the transmitter modulates the video, time code, and tally status signals by encoding these signals into a VITC format for transmission.

7. A video production device as in claim 6, wherein said transmitter include a switch to select one of at least two transmission frequencies for transmission.

8. A video production device as in claim 6, further comprising:

a receiver to receive the modulated signal sent by said transmitter, said receiver demodulating said signal into its VITC-encoded video and audio component signals, the demodulated video and audio signals are provided to output ports of said receiver.

9. A video production device as in claim 2, wherein said transmitter receives its power by tapping into the power source for said camcorder.

10. A video production device as in claim 2, wherein said transmitter include a switch to select one of at least two transmission frequencies for transmission.

11. A video production device as in claim 2, further comprising:

a receiver to receive the modulated signal sent by said transmitter, said receiver demodulating said signal into its original video, audio, and time code components and providing these signals at output ports of said receiver.

12. A video production device as in claim 11, wherein the receiver has a first receiving antenna and at least a second receiving antenna where the signal from among said first and said at least a second antenna is selected for demodulation according to a space diversity antenna system circuit.

13. A video production device as in claim 2, wherein the transmitter modulates the video and time code signals by encoding these signals into a VITC format for transmission.

14. A video production device as in claim 13, wherein said transmitter include a switch to select one of at least two transmission frequencies for transmission.

15. A video production system comprising:

a transmitter, said transmitter receiving video, audio and time code signals from a camcorder, said transmitter modulating and transmitting the video, audio and time code signals via an antenna; and a receiver to receive the modulated signal sent by said transmitter, said receiver demodulating said signal into its original video, audio and time codes signals.

16. A video production system comprising:

a transmitter, said transmitter receiving video, audio and tally status signals from a camcorder, said transmitter modulating and transmitting the video, audio and tally status signals via an antenna; and a receiver to receive the modulated signal sent by said transmitter, said receiver demodulating said signal into its original video, audio and tally status signals.

17. A video production system comprising:

a transmitter, said transmitter receiving video, audio, tally status and time code signals from a camcorder, said transmitter modulating and transmitting the video, audio, tally status and time code signals via an antenna; and a receiver to receive the modulated signal sent by said transmitter, said receiver demodulating said signal into its original video, audio, tally status and time codes signals.

18. An audio-video production enhancing system comprising:

a camcorder supported transmitter receiving power from a camcorder mounted power source, said transmitter also receiving a video signal, an audio signal, a time code signal, and a tally status signal from a camcorder, known as said monitored signals, said transmitter processing said monitored signals and transmitting said signals using subcarrier transmission from a camcorder mounted transmitting antenna;

a receiver attached to a receiving antenna; said receiver receiving said monitored signals and demodulating them to their separate signals and providing said signals at output ports.

19. A video production device comprising:

a transmitter, said transmitter receiving video, audio, time code and tally status signals from a camcorder, said transmitter modulating and transmitting the video, audio, time code and tally status signals via an omnidirectional antenna;

a receiver to receive the modulated signal sent by said transmitter, said receiver demodulating said signal into its original video, audio, time code, and tally status components signals, the demodulated video and audio signals are provided to output ports of said receiver, the time code signal is routed to a time code reader circuit which generates a LTC signal to a time code output port, said tally status signal is provided to a control signal generator which produces a control output signal pattern which includes tally status information in the control signal pattern at a predetermined location according to a recording device receiving the control signal.

20. A video production device as in claim 19, wherein said receiver also includes a video superimpose circuit, said superimpose circuit receives a time code signal from a time code reader circuit, the superimpose circuit generates a signal superimposing a window displaying the time code in the video signal output from said receiver, the time code reader circuit also generates a LTC signal to a time code output port of said receiver.

21. A video production device as in claim 20, further comprising:

a video monitoring and recording device receiving the video, audio, time code, and tally status signals from said receiver's respective output ports, a recording function of said receiver being controlled according to the tally status from said camcorder contained in said data signal received from said receiver.

22. A video production device as in claim 21, wherein a battery supplying power to said receiver is supported by a monitor-recorder/receiving unit.

23. A video production device as in claim 20, further comprising:

a video superimpose switch in said receiver which when in a first position provides said original video component signal directly to a video output port, and when in a second position connects the original component signal through the video superimpose circuit to said video output port.

24. A video production device as in claim 19, wherein the receiver has a first receiving antenna and at least a second receiving antenna where the signal from among said first and said at least a second antenna is selected for demodulation according to a space diversity antenna system circuit.

25. A video production device as in claim 19, further comprising:

a switch to select one of at least two transmission frequencies for reception.

26. A video production device as in claim 19, further comprising:

a tally signal assessor receiving said tally status signal and said LTC signal from said time code reader, said tally signal assessor evaluates whether a tally status signal is present and provides a tally signal ON indication to the control signal generator, the control signal generator then produces its output pattern based on this ON indication.

27. A video production device comprising:

a transmitter receiving video, audio, and time code signals from a camcorder, said transmitter modulating and transmitting the video, audio, and time code signals via an omnidirectional antenna, said transmitter being mounted to the camcorder and said omnidirectional antenna being supported from the camcorder-mounted transmitter; and a receiver to receive the modulated signal sent by said transmitter, said receiver demodulating said signal into its original video, audio, and time code component signals and providing the audio signal directly to output ports of said receiver, said receiver also including a video superimpose circuit, said superimpose circuit receiving a time code signal from a time code reader circuit, the superimpose circuit generating a signal superimposing a window displaying the time code in the video signal output from said receiver, the time code reader circuit also generating a LTC signal to a time code output port of said receiver.

28. A video production device as in claim 27, further comprising:

a time code assessor circuit that also receives a signal from the time code reader circuit and senses when the time code value is changing, when said time code value is changing said assessor circuit produces an ON indication signal to a control signal generator which produces a control output signal pattern which includes tally status information in the control signal pattern at a predetermined location according to a recording device receiving the control signal, when the time code value is changing the tally status information in the control signal causes the recording device to record.

29. A video production device as in claim 28, further comprising:

a video monitoring and recording device receiving the video, audio, time code, and tally status signals from said receiver's respective output ports, a recording function of said receiver being controlled according to the tally status signal from said camcorder contained in said data signal received from said receiver.

30. A video production device as in claim 28, further comprising:

a tally signal assessor circuit that receives a tally ON indication signal from a VITC decoder/reader/converter that also decodes the time code signal, said tally signal assessor circuit provides a tally signal ON indication to the control signal generator, the control signal generator then uses this ON indication and ignores the indication signal from the time code assessor circuit to provide an control output signal pattern.

31. A video production device as in claim 27, further comprising:

a video superimpose switch in said receiver which when in a first position provides said original video component signal directly to a video output port, and when in a second position connects the original component signal through the video superimpose circuit to said video output port.

32. A video production device as in claim 27, further comprising:

a switch to select one of at least two transmission frequencies for reception.

33. A video production device comprising:

a transmitter receiving video, audio, tally status and time code signals from a camcorder, said transmitter modulating these signals by encoding them into a VITC format for transmission and then transmitting the video, audio, tally status and time code signals via an omnidirectional antenna; and a receiver to receive the modulated signal sent by said transmitter, said receiver demodulating said signal into its original video and audio component signals, the demodulated video and audio, signals are provided to output ports of said receiver, the video signal is also routed to a VITC decoder/reader circuit, a tally status signal is provided from the VITC decoder/reader circuit to a tally signal assessor circuit, said tally signal assessor circuit provides a tally ON indication to a control signal generator.

34. A video production device as in claim 33, wherein said receiver also including a video superimpose circuit, said superimpose circuit receives a time code signal from the time code reader circuit, the superimpose circuit generates a signal superimposing a window displaying the time code in the video signal output from said receiver.

35. A video production device as in claim 34, further comprising:

a video superimpose switch in said receiver which when in a first position provides said original video component signal directly to the video output port, and when in a second position connects the original component signal through the video superimpose circuit to the video output port.

36. A video production device as in claim 33, wherein a digital audio signal demodulation circuit receives a digital audio output from said VITC decoder/reader and provides an analog audio signal to an audio output port.

37. A video production device as in claim 18 wherein the receiver includes a digital audio signal processor.

38. A video production device comprising:

a transmitter, said transmitter receiving video, audio, tally status and time code signals from a camcorder, said transmitter modulating and transmitting the video, audio, tally status and time code signals via an omnidirectional antenna; and a receiver to receive the modulated signal sent by said transmitter, said receiver demodulating said signal into its original video, and audio component signals, the demodulated video and audio, signals are provided to output ports of said receiver, the video signal is also routed to a VITC decoder/reader circuit, a tally status signal is provided from the VITC decoder/reader circuit to a tally signal assessor circuit, said tally signal assessor circuit provides a tally ON indication to a control signal generator.

39. A video production device as in claim 38, further comprising:

an ENG transmitter to transmit the signals provided to said output ports of said receiver;

an ENG receiver to receive the signals transmitted by said ENG transmitter;

a remote VTR controller receiving the video signal from the ENG receiver, said controller having a VITC reader circuit, said VITC reader circuit providing a video signal at a video output port of said VTR controller, a LTC output signal to an LTC output port of said VTR controller, and a tally status signal to a control signal generator circuit in said VTR controller, said control signal generator produces a control output signal pattern which includes tally status information in the control signal pattern at a predetermined location to control the recording function of the VTR to be controlled.

40. A wireless device for a camcorder comprising:

a camcorder supported transmitter receiving power from a camcorder mounted power source, said transmitter also receiving a video signal, an audio signal, a time code signal, and a tally status signal from a camcorder, the transmitter processing these signals and transmitting these signals using subcarrier transmission from a camcorder mounted transmitting antenna;

a receiver attached to a receiving antenna, said receiver receiving the transmitted signals and demodulating them to their separate signals and providing said signals at output ports, the receiver producing a superimpose window in the video output signal of the receiver with the time code signal displayed therein.

41. A professional quality camcorder mounted accessory comprising:

a transmitter module being connected to receive video, audio, and time code input signals from the camcorder, said transmitter module modulating the signals so that they may all be transmitted by an omnidirectional transmitting antenna;

a separate receiving module having a receiving antenna for receiving said transmitted signals, said receiving module demodulating said signals to reproduce the video, audio, and time code signals from said camcorder, said receiving module having a superimpose window circuit that creates a superimposed window on said video signal and displays the time code received from the camcorder therein;

said receiving module further having a tally indicating circuit therein that continuously monitors the time code, when the time code is advancing the tally indicating circuit detects the advancement and causes a monitoring/recording device to record the audio-visual image whenever the time code is advancing.

42. A method of video production comprising the steps of:

shooting a scene with a camcorder;

providing camcorder output signals including video, audio, time code, and tally status signal to a camcorder mounted transmitter;

modulating said signals into a single signal;

transmitting said single signal to a receiver;

receiving said single signal at a receiver;

demodulating said single signal into its video, audio, time code and tally status signal components;

providing at a user's option a superimpose window in said video signal, generating a data output signal pattern which includes tally status signal information in the control signal pattern at a predetermined location according to a local monitoring and recording device;

monitoring said video signal on the local monitoring and recording device; and starting and stopping a recording function of said monitoring and recording device according to said tally status signal.

43. A video production device comprising:

a transmitter, said transmitter receiving video, audio, tally status and time code signals from a camcorder, said transmitter modulating these signals by encoding them into a VITC format for transmission, and transmitting the modulated signal via an omnidirectional antenna; and a receiver to receive the modulated signal sent by said transmitter, said receiver demodulating said signal into its original VITC-encoded video and audio component signals, the demodulated audio and VITC-encoded video signals being provided to audio and video output ports of said receiver, the VITC-encoded video signal being also routed to a VITC reader, the VITC reader extracting time code and tally status signals from the VITC-encoded video signal, the time code signal being sent to a time code reader circuit which generates a LTC signal to a time code output port, said tally status signal being provided to a control signal generator which produces a control output signal pattern which includes tally status information in the control signal pattern at a predetermined location according to a recording device receiving the control signal.

44. A video production device as in claim 43, wherein said receiver also including a video superimpose circuit, said superimpose circuit receives the time code signal from the time code reader circuit, the superimpose circuit generates a signal superimposing a window displaying the time code in the video signal output from said receiver, the time code reader circuit also generates a LTC signal to a time code output port of said receiver.

45. A video production device as in claim 44, further comprising:

a video monitoring and recording device receiving the video, audio, time code, and tally status signals from said receiver's respective output ports, a recording function of said receiver being controlled according to the tally status signal from said camcorder contained in said control signal received from said receiver.

46. A video production device comprising:

a transmitter receiving video, audio, tally status and time code signals from a camcorder, said transmitter modulating these signals by encoding them into a VITC format for transmission, and transmitting the modulated signal via an omnidirectional antenna; and a receiver to receive the modulated signal sent by said transmitter, said receiver demodulating said signal into its VITC-encoded video and audio component signals, the demodulated video and audio signals being provided to output ports of said receiver, the VITC-encoded video signal being routed to a time code reader circuit, said receiver also including a video superimpose circuit, said superimpose circuit receiving a time code signal from the time code reader circuit, the superimpose circuit generating a signal superimposing a window displaying the time code in a video signal output from said video superimpose circuit to a local video signal monitoring port of said receiver.

47. A video production device comprising:

a transmitter receiving video, audio, tally status and time code signals from a camcorder, said transmitter modulating signals by encoding them into a VITC format for transmission, and transmitting the modulated signal via an omnidirectional antenna;

a receiver to receive the modulated signal sent by said transmitter, said receiver demodulating said signal into its VITC-encoded video and audio component signals, the demodulated video and audio signals being provided to output ports of said receiver;

an ENG transmitter to transmit the signals provided to said output ports of said receiver;

an ENG receiver to receive the signals transmitted by said ENG transmitter;

a remote VTR controller receiving the video signal from the ENG receiver, said controller having a VITC reader circuit, said VITC reader circuit providing a video signal at a video output port of said VTR controller, a LTC output signal to a LTC output port of said VTR controller; and a control signal to a control signal generator circuit in said VTR controller, said control signal generator producing a control output signal pattern which includes tally status information in the control signal pattern at a predetermined location to control the recording function of the VTR to be controlled.

\* \* \* \* \*